(12) United States Patent
Lu et al.

(10) Patent No.: US 12,504,326 B2
(45) Date of Patent: Dec. 23, 2025

(54) INTELLIGENT PREDICTION METHOD FOR TENSILE STRENGTH OF FSW JOINTS CONSIDERING WELDING TEMPERATURE AND AXIAL FORCE

(71) Applicant: DALIAN UNIVERSITY OF TECHNOLOGY, Dalian (CN)

(72) Inventors: Xiaohong Lu, Dalian (CN); Chong Ma, Dalian (CN); Zhenyuan Jia, Dalian (CN); Shixuan Sun, Dalian (CN); Yihan Luan, Dalian (CN); Le Teng, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 18/021,904

(22) PCT Filed: Sep. 26, 2022

(86) PCT No.: PCT/CN2022/121213
§ 371 (c)(1),
(2) Date: Feb. 17, 2023

(87) PCT Pub. No.: WO2023/231244
PCT Pub. Date: Dec. 7, 2023

(65) Prior Publication Data
US 2024/0264002 A1 Aug. 8, 2024

(30) Foreign Application Priority Data
Jun. 2, 2022 (CN) .......................... 202210625492.8

(51) Int. Cl.
*G01J 5/00* (2022.01)
*B23K 20/12* (2006.01)

(52) U.S. Cl.
CPC ........ *G01J 5/0018* (2013.01); *B23K 20/1235* (2013.01); *G01J 2005/0077* (2013.01)

(58) Field of Classification Search
CPC .... G01J 5/00; G01J 5/0018; G01J 2005/0077; B23K 20/02; B23K 20/20006;
(Continued)

(56) References Cited

U.S. PATENT DOCUMENTS 8,544,714 B1 * 10/2013 Obaditch ............. B23K 20/123
228/2.1
9,810,348 B2 * 11/2017 Rust ....................... B23K 20/02
(Continued)

FOREIGN PATENT DOCUMENTS

CN 109977948 A 7/2019
CN 112388148 A 2/2021
(Continued)

OTHER PUBLICATIONS

Luigi Alberto Ciro De Filippis et al., Prediction of the Vickers Microhardness and Ultimate Tensile Strength of AA5754 H111 Friction Stir Welding Butt Joints Using Artificial Neural Network, Materials, Nov. 10, 2016, 17 pages, vol. 9, issue 11.
(Continued)

*Primary Examiner* — Andrew Joseph Rudy
(74) *Attorney, Agent, or Firm* — MUNCY, GEISSLER, OLDS & LOWE, P.C.

(57) ABSTRACT

The invention belongs to the field of friction stir welding (FSW) quality prediction and relates to an intelligent prediction method for the tensile strength of FSW joints considering welding temperature and axial force. The invention uses a combination of experiment and theory. FSW experiment is carried out, the infrared thermal imager and force sensor are used to obtain the temperature of the feature points on the advancing side and retreating side of the
(Continued)

outside of the shoulder of the weldment surface and the axial force during FSW process. The obtained data is used to train and test the one-dimensional convolutional neural network. The tensile strength prediction of friction stir welding is realized, which provided a reference for welding process control.

1 Claim, 2 Drawing Sheets

(58) Field of Classification Search
CPC .... B23K 20/12; B23K 20/123; B23K 20/125; B23K 20/1235; B23K 20/1255
USPC .......................................................... 706/15
See application file for complete search history.

(56) References Cited

U.S. PATENT DOCUMENTS

2005/0017713 A1* 1/2005 Goldfine ............. B23K 20/122
324/240
2024/0399492 A1* 12/2024 Fleck .................. B23K 20/123

FOREIGN PATENT DOCUMENTS

| CN | 112643190 A | 4/2021 |
| CN | 114888426 A | 8/2022 |
| WO | WO2010050834 A1 | 5/2010 |
| WO | WO2021007812 A1 | 1/2021 |

OTHER PUBLICATIONS

Mohammad W. Dewan et al., Prediction of tensile strength of friction weld joints with adaptive neuro-fuzzy inference system (ANFIS) and neural network, Materials and Design, Dec. 8, 2015, pp. 288-299, vol. 92.

Shubham Verma et al., Prediction of tensile behavior of FS welded AA7039 using machine learning, Materials Today Communications, Dec. 2, 2020, 24 pages.

Fan, "Prediction and Optimization of Tensile Strength of 7A52 High Strength Aluminum Alloy FSW Joints Based on Response Surface Method," Transactions of the China Welding Institution, Sep. 2021, vol. 42(9), pp. 55-60, 6 pages.

* cited by examiner

INTELLIGENT PREDICTION METHOD FOR TENSILE STRENGTH OF FSW JOINTS CONSIDERING WELDING TEMPERATURE AND AXIAL FORCE

TECHNICAL FIELD

The invention belongs to the field of friction stir welding (FSW) quality prediction, which specifically relates to an intelligent prediction method for the tensile strength of FSW joints considering welding temperature and axial force. The infrared thermal imager and force sensor are used to collect temperature and force, and the tensile strength is predicted by one-dimensional convolutional neural network deep learning model.

BACKGROUND TECHNOLOGY

With the rapid development of aerospace industry, aerospace demand has higher requirements for spacecraft manufacturing technology. In 1991, the British Welding Institute invented FSW technology. The FSW tool consists of a shoulder and a stirring pin. The shoulder provides heat through friction during FSW process, which softens the welded metal and prevents the softened metal from flowing out of the welding area. The stirring pin is rotated in the welding area to enhance the fluidity of the softened metal. The low heat input generated by FSW effectively solves the problems of large plate deformation and slow welding speed in traditional welding of low melting point alloys such as aluminum alloy and magnesium alloy. FSW is widely used in aerospace, shipbuilding, automobile and other fields. Tensile strength is usually used as the evaluation standard of welding quality. According to different product needs, tensile strength must be qualified to be applied to production.

Luigi used ANN in "Prediction of the Vickers Microhardness and Ultimate Tensile Strength of AA5754 H111 Friction Stir Welding Butt Joints Using Artificial Neural Network". The microhardness and tensile strength of AA5754 H111FSW were predicted by using the welding parameters, the thermal data during FSW process and the sample position as input. Mohammad W. Dewan established the optimized adaptive neuro-fuzzy inference system (ANFIS) model in "Prediction of tensile strength of friction weld joints with adaptive neuro-fuzzy inference system (ANFIS) and neural network". The tensile strength of AA2219-T87 FSW joint was predicted by using welding parameters of rotational speed, welding speed and axial force as input. In "Prediction of tensile behavior of FS welded AA7039 using machine learning", Verma used machine learning methods such as Gaussian regression (GPR), support vector machine (SVM), artificial neural network and linear regression to predict the ultimate tensile strength of AA7039 aluminum alloy FSW with rotational speed, welding speed and tilt angle as input. The correlation coefficient (CC) and root mean square error (RMSE) were used as the evaluation parameters of prediction accuracy and it was concluded that the artificial neural network was the most effective for tensile strength prediction. In "Prediction and Optimization of Tensile Strength of 7A52 High Strength Aluminum Alloy FSW Joints Based on Response Surface Method", Fan used response surface method to study the effects of welding parameters, including welding speed, rotational speed of stirring head and shoulder depth on tensile strength of FSW joints.

FSW process parameters include stirring head speed, welding speed, etc. Different parameter combinations can form different quality joints, and the corresponding microstructure and mechanical properties are also different. The welding process parameters indirectly affect the tensile strength by affecting the axial force and temperature. The tensile strength changes with the change of axial force and welding temperature. The existing research on the prediction of tensile strength by welding process parameters cannot accurately reflect the dynamic influence of welding process parameters on tensile strength during welding. At the same time, the existing research does not comprehensively consider the influence of axial force and temperature time series data on tensile strength.

Invention Content

The invention overcomes the shortcomings of the existing technology, comprehensively considers the axial force and the temperature of the feature points on the advancing side (AS) and retreating side (RS) of the weldment surface, which directly affect the tensile strength, and proposes one-dimensional convolutional neural network (1D CNN). The time series data of the temperature and axial force of the AS and RS feature points of the weldment surface during FSW process are used as input to predict the tensile strength, which provides a reference for the regulation of the welding process.

The Technical Scheme of the Invention

An intelligent prediction method for tensile strength of FSW joints considering welding temperature and axial force. The time series data of the temperature of the AS and RS feature points of the weldment surface and axial force are obtained by infrared thermal imager and force sensor. The one-dimensional convolutional neural network (1D CNN) is trained and tested with the acquired time series data to realize the prediction of the tensile strength of FSW joints. The specific steps are as follows:

Step 1: During FSW process, the temperature of the AS and RS feature points of the weldment surface and axial force are obtained by infrared thermal imager and force sensor.

Step 2: The sampling frequency of the infrared thermal imager is different from that of the force sensor. The common multiple of the sampling frequency of the infrared thermal imager and the force sensor is taken as the common sampling frequency fs. By resampling method, the sampling frequency of the two devices is controlled to be the same, and the time series data of the temperature of the AS and RS feature points and the axial force are obtained. Meanwhile, the number of sampling points N is determined according to the welding duration.

Step 3: The length of the welding interval is calculated according to the welding speed, sampling frequency, and the number of sampling points, and the tensile strength of this interval is obtained through the tensile test.

Step 4: The temperature and axial force data processed in step 2 are processed into an N*3 matrix, and the tensile strength obtained in step 3 is processed into a 1*1 matrix, and the data set is prepared for the training and testing of one-dimensional convolutional neural network.

Step 5: 1D CNN is established: The model has three inputs, including the time series data of the temperature of the AS and RS feature points and axial force, and the output is the tensile strength. According to step 4, the input matrix of the 1D CNN is N*3 and the output matrix is 1*1. 1D CNN is established, and the parameters of 1D CNN are preset, including the number of convolutional layers, the number and size of convolution kernel, the number and size of pooling layers, the number of fully connected layers and the number of units, and the activation function.

Step 6: Huber robust loss function is used as an evaluation criterion, the N*3 temperature and axial force matrix processed in Step 4 is used as the input, and the 1*1 tensile strength matrix is used as the output to train the model. The parameters in Step 5 are optimized by the Huber loss function, and the 1D CNN prediction model with the parameter combination with the highest prediction accuracy is finally saved.

Step 7: During the actual welding process, the temperature of the AS and RS feature points of the weldment surface and axial force obtained by the infrared thermal imager and the force sensor are processed in step 2 and step 4, and used as the input of the optimized 1D CNN model in Step 6 to predict the tensile strength.

The beneficial effect of the invention is as follows: through the combination of experiment and theory, 1D CNN tensile strength prediction model is established, which takes the axial force and the temperature time series data of the AS and RS feature points of the weldment surface on as input, and finally obtains the predicted value of tensile strength without carrying out destructive test on the weldment.

DETAILED DESCRIPTION

Figure 1:
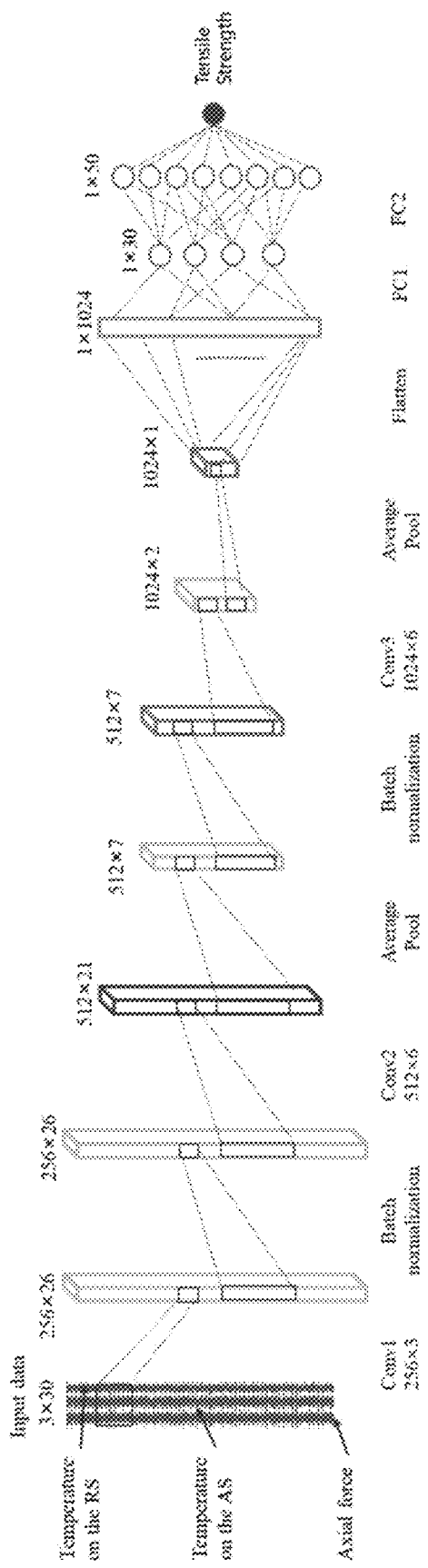
FIG. 1 is 1D CNN structure diagram.

The specific implementation method of the invention is described in detail by combining the technical scheme and the accompanying drawings, but the invention is not limited by the embodiment.

This example uses the infrared thermal imager, the force sensor, and 1D CNN based on Python to predict the tensile strength of 2219 aluminum alloy FSW joints. The specific steps are as follows:

Step 1: During the FSW process, the infrared thermal imager is used to collect the temperature of the feature points on the AS and RS of the weldment surface. The axial force is obtained by the force sensor, and the tensile strength is obtained by the tensile test.

Step 2: The resample function in the pandas class of python is used to resample the temperature data, and the tensile strength is obtained by tensile strength test combined with sampling frequency, welding speed and number of sampling points. The time series data of axial force and temperature and tensile strength are correlated in chronological order, the format is shown in Table 1, which contains a training sample in the training set of the dataset. The experiment yielded the dataset with 50 samples: 30 samples for training, 10 samples for validation, and 10 samples for testing.

TABLE 1

A training sample in the training set of the dataset

| No. | Time | Axial force (KN) | The temperature on the AS (° C.) | The temperature on the RS (° C.) | Tensile strength (MPa) |
|---|---|---|---|---|---|
| 1 | 3:17:49 | 50.26859 | 261.13 | 261.09 | 316.1667 |
| 2 | 3:17:49 | 49.97173 | 260.83 | 261.58 | 316.1667 |
| 3 | 3:17:50 | 50.60247 | 260.87 | 262.2 | 316.1667 |
| 4 | 3:17:51 | 50.47803 | 260.54 | 261.46 | 316.1667 |
| 5 | 3:17:51 | 51.98494 | 260.37 | 261.87 | 316.1667 |
| 6 | 3:17:52 | 51.3163 | 260.38 | 262.22 | 316.1667 |
| 7 | 3:17:52 | 51.42241 | 260.44 | 262.02 | 316.1667 |
| 8 | 3:17:53 | 51.18752 | 260.78 | 261.95 | 316.1667 |
| 9 | 3:17:54 | 51.4009 | 261.28 | 261.89 | 316.1667 |
| 10 | 3:17:54 | 51.52372 | 261.69 | 261.54 | 316.1667 |
| 11 | 3:17:55 | 51.51139 | 260.97 | 260.54 | 316.1667 |
| 12 | 3:17:55 | 51.04363 | 256.91 | 260.95 | 316.1667 |
| 13 | 3:17:56 | 51.23686 | 257.19 | 260.85 | 316.1667 |
| 14 | 3:17:57 | 51.26344 | 261.83 | 260.83 | 316.1667 |
| 15 | 3:17:57 | 51.84148 | 263.5 | 260.89 | 316.1667 |
| 16 | 3:17:58 | 51.87087 | 264.66 | 260.93 | 316.1667 |
| 17 | 3:17:58 | 52.35383 | 265.51 | 260.48 | 316.1667 |
| 18 | 3:17:59 | 52.29366 | 265.36 | 260.33 | 316.1667 |
| 19 | 3:18:00 | 52.32977 | 265.71 | 260.62 | 316.1667 |
| 20 | 3:18:00 | 52.1057 | 266.21 | 260.27 | 316.1667 |
| 21 | 3:18:01 | 52.5434 | 266.63 | 260.8 | 316.1667 |
| 22 | 3:18:01 | 52.16335 | 267.06 | 261.24 | 316.1667 |
| 23 | 3:18:02 | 52.57334 | 267.77 | 261.17 | 316.1667 |
| 24 | 3:18:03 | 52.62735 | 267.82 | 260.89 | 316.1667 |
| 25 | 3:18:03 | 52.81699 | 268.46 | 261.03 | 316.1667 |
| 26 | 3:18:04 | 52.90594 | 268.88 | 261.05 | 316.1667 |
| 27 | 3:18:04 | 53.23751 | 269.38 | 261.05 | 316.1667 |
| 28 | 3:18:05 | 53.2276 | 270.03 | 261.65 | 316.1667 |
| 29 | 3:18:06 | 53.40029 | 270.88 | 261.87 | 316.1667 |
| 30 | 3:18:06 | 53.47949 | 271.17 | 261.85 | 316.1667 |

Step 3: The function is written by python. Firstly, the dataset obtained in step 2 is read, and the input data in the training set, including the axial force, the temperature of the AS and RS feature points, are normalized. Dataset is segmented according to 1D CNN 30*3 input matrix and 1*1 output matrix.

Step 4: 1D CNN is established using Keras in python. Taking the 30*3 matrix, including the axial force, the temperature of the AS and RS feature points as input, the following operations are carried out in turn: The input data is processed in conv1, batch normalization layer, conv2, pooling layer 1, batch normalization layer, conv3, pooling layer 2, fully connected layer 1 and fully connected layer 2 to output the tensile strength in the output layer. As shown in FIG. 1, the number of convolution layers is 3; the number and size of convolution kernels are 265×5, 512×6 and 1024×6 respectively; the number of pooling layers is 2; the size of pooling layers is 3; the number of fully connected layers is 2 and the number of units is 30 and 50 respectively; the activation function is ReLU.

Figure 2:
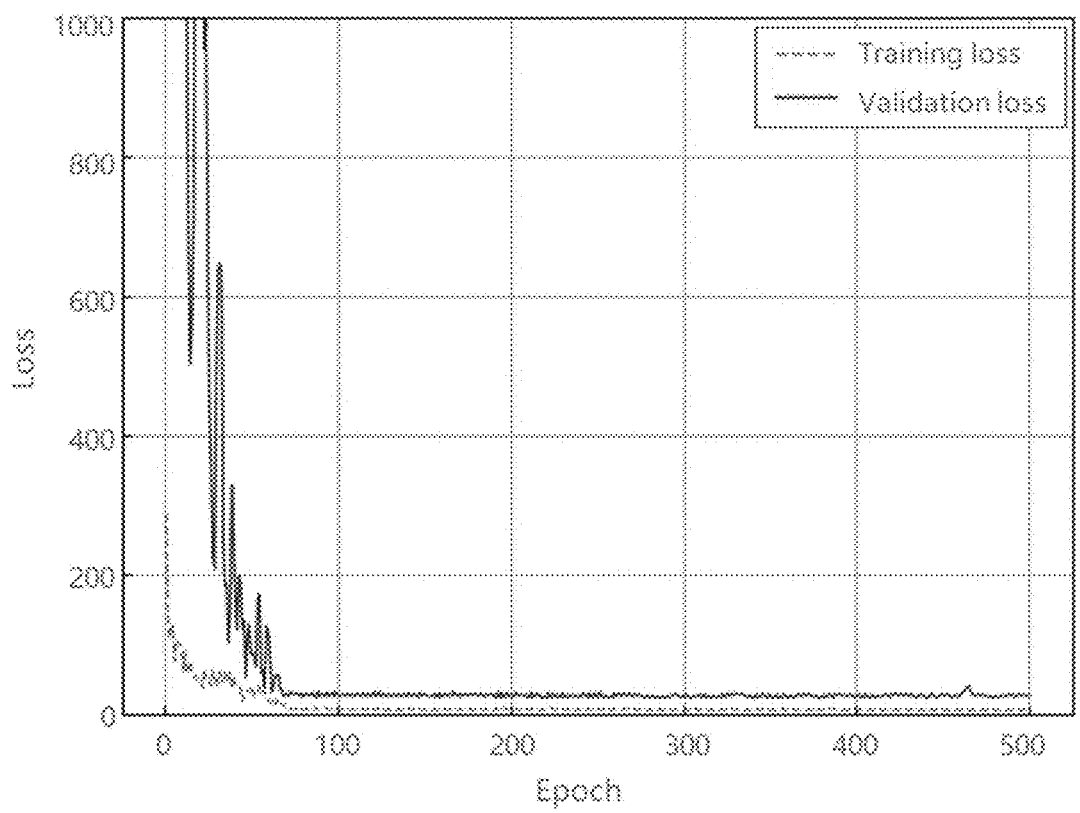
FIG. 2 is the loss function curves of training set and validation set.

Step 5: The dataset is divided by the training set, validation set, and test set ratio, which is 6:2:2. The established 1D CNN is trained for 500 rounds, the initial learning rate is 0.1, the error curve is drawn as shown in FIG. 2 and the trained neural network is saved.

Step 6: The trained 1D CNN prediction model is called to predict tensile strength of the test set and the prediction results are saved.

Figure 3:
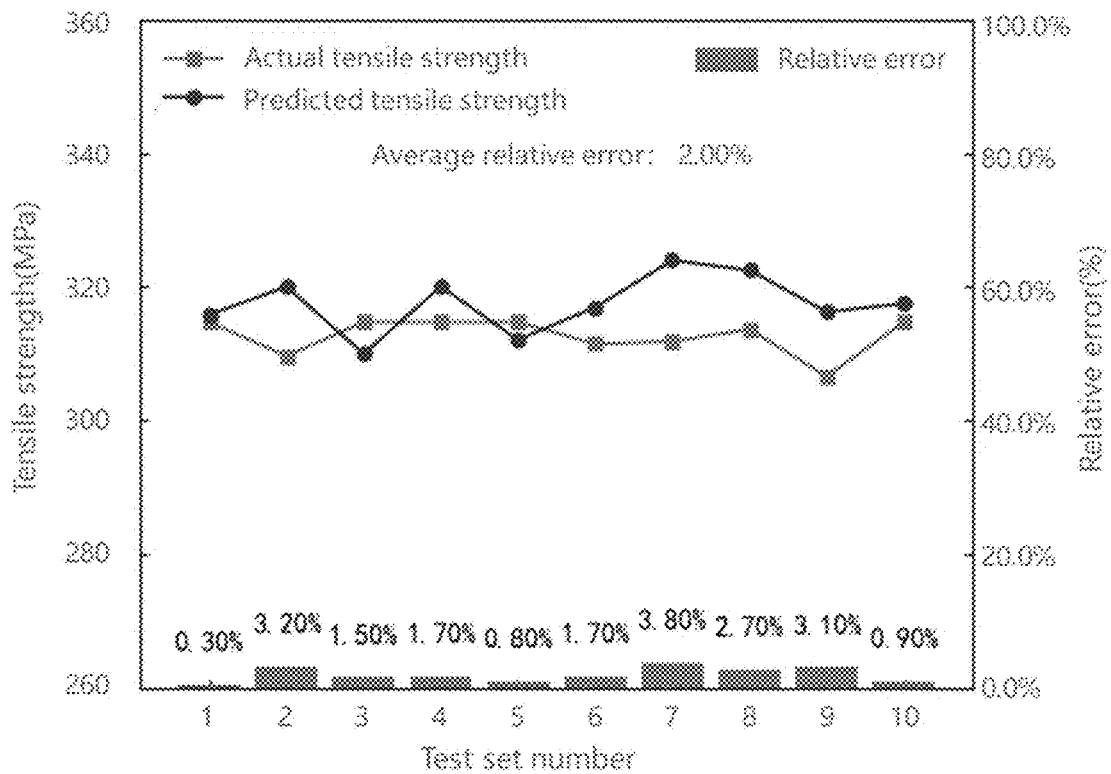
FIG. 3 is the prediction result of tensile strength based on 1D CNN.

Using 1D CNN prediction model to predict the tensile strength of 2219 aluminum alloy FSW, as shown in FIG. 3. According to the prediction results, there is an average relative error of roughly 2% between the predicted value and the experimental value, demonstrating the effectiveness of this approach for predicting tensile strength.

The invention claimed is:

1. An intelligent prediction method for tensile strength of friction stir welding (FSW) joints considering welding temperature and axial force, wherein, the time series data of temperature on the advancing side (AS) and retreating side (RS) of the outside of the shoulder of the weldment surface and axial force are obtained by infrared thermal imager and force sensor; the one-dimensional convolutional neural network (1D CNN) is trained and tested with the acquired time series data to realize the prediction of the tensile strength of FSW joints; the specific steps are as follows:

Step 1: during FSW process, the temperature of feature points on the AS and RS of the outside of the shoulder of the weldment surface and axial force are obtained by infrared thermal imager and force sensor;

Step 2: the sampling frequency of the infrared thermal imager is different from that of the force sensor; the common multiple of the sampling frequency of the infrared thermal imager and the force sensor is taken as the common sampling frequency fs; By resampling method, the sampling frequency of the two devices is controlled to be the same, and the time series data of the temperature of the feature points on the AS and RS and the axial force are obtained; Meanwhile, the number of sampling points N is determined according to the welding duration;

Step 3: the length of the welding interval is calculated according to the welding speed, sampling frequency, and the number of sampling points, and the tensile strength of this interval is obtained through the tensile test;

Step 4: the temperature and axial force data processed in step 2 are processed into an N*3 matrix, and the tensile strength obtained in step 3 is processed into a 1*1 matrix, and the data set is prepared for the training and testing of one-dimensional convolutional neural network;

Step 5: 1D CNN is established: the model has three inputs, including the time series data of the temperature of the feature points on the AS and RS and axial force, and the output is the tensile strength; According to step 4, the input matrix of the 1D CNN is N*3 and the output matrix is 1*1; 1D CNN is established, and the parameters of 1D CNN are preset, including the number of convolutional layers, the number and size of convolutional nuclei, the number and size of pooling layers, the number of fully connected layers and the number of units, and the activation function;

Step 6: Huber robust loss function is used as an evaluation criterion, the N*3 temperature and axial force matrix processed in Step 4 is used as the input, and the 1*1 tensile strength matrix is used as the output to train the model; the parameters in Step 5 are optimized by the Huber loss function, And the 1D CNN prediction model with the parameter combination with the highest prediction accuracy is finally saved;

Step 7: during the actual welding process, the temperature of feature points on the AS and RS of the outside of the shoulder of the weldment surface and axial force obtained by the infrared thermal imager and the force sensor are processed in step 2 and step 4, and used as the input of the optimized 1D CNN model in Step 6 to predict the tensile strength.

* * * * *